(12) United States Patent
White et al.

(10) Patent No.: US 7,814,115 B2
(45) Date of Patent: Oct. 12, 2010

(54) MULTI-DIMENSIONAL SEARCH RESULTS ADJUSTMENT SYSTEM

(75) Inventors: Scott White, Austin, TX (US); Steven Neil Tischer, Atlanta, GA (US)

(73) Assignee: AT&T Intellectual Property I, LP, Reno, NV (US)

( * ) Notice: Subject to any disclaimer, the term of this patent is extended or adjusted under 35 U.S.C. 154(b) by 344 days.

(21) Appl. No.: 11/873,266

(22) Filed: Oct. 16, 2007

(65) Prior Publication Data

US 2009/0100019 A1    Apr. 16, 2009

(51) Int. Cl.
G06F 17/30    (2006.01)
G06F 7/00    (2006.01)

(52) U.S. Cl. ...................................... 707/765
(58) Field of Classification Search ........................ None
See application file for complete search history.

(56) References Cited

U.S. PATENT DOCUMENTS

| | | |
|---|---|---|
| 6,693,651 B2 | 2/2004 | Biebesheimer et al. |
| 2002/0105550 A1 | 8/2002 | Biebesheimer et al. |
| 2002/0107842 A1 | 8/2002 | Biebesheimer et al. |
| 2002/0143759 A1 | 10/2002 | Yu |
| 2003/0115187 A1 | 6/2003 | Bode et al. |
| 2004/0064447 A1* | 4/2004 | Simske et al. .................. 707/5 |
| 2005/0171940 A1 | 8/2005 | Fogg et al. |
| 2005/0216434 A1* | 9/2005 | Haveliwala et al. ............. 707/1 |
| 2005/0243783 A1 | 11/2005 | Lee et al. |
| 2005/0251496 A1 | 11/2005 | DeCoste et al. |
| 2005/0283473 A1 | 12/2005 | Rousso et al. |
| 2006/0004734 A1 | 1/2006 | Malkin et al. |
| 2006/0074864 A1 | 4/2006 | Naam et al. |
| 2006/0074883 A1 | 4/2006 | Teevan et al. |
| 2006/0085395 A1 | 4/2006 | Cradick et al. |
| 2006/0129536 A1 | 6/2006 | Foulger et al. |
| 2006/0206454 A1 | 9/2006 | Foorstall et al. |
| 2006/0235768 A1 | 10/2006 | Tatum et al. |
| 2006/0274042 A1 | 12/2006 | Krah et al. |
| 2007/0021165 A1 | 1/2007 | Ma et al. |
| 2007/0074254 A1 | 3/2007 | Sloo |
| 2007/0078828 A1 | 4/2007 | Parikh et al. |
| 2007/0117625 A1 | 5/2007 | Marks et al. |
| 2007/0198485 A1* | 8/2007 | Ramer et al. .................... 707/3 |
| 2008/0208819 A1* | 8/2008 | Wang et al. .................... 707/3 |

* cited by examiner

*Primary Examiner*—Charles Rones
*Assistant Examiner*—Alicia M Lewis
(74) *Attorney, Agent, or Firm*—Larson Newman & Abel, LLP

(57) ABSTRACT

A search query comprising a plurality of search terms is used to generate a plurality of search results. The search query, in its entirety, is represented by an object in multi-dimensional space. The multi-dimensional space comprises a plurality of dimensions to represent a plurality of search criteria, respectively. The object has a position in the multi-dimensional space based on values of the search criteria. The object is manipulated simultaneously in at least two dimensions of the multi-dimensional space to simultaneously modify respective values of at least two of the search criteria. The search results are filtered based on the modified values of the search criteria to produce a subset of the search results, and the subset is displayed.

9 Claims, 4 Drawing Sheets

MULTI-DIMENSIONAL SEARCH RESULTS ADJUSTMENT SYSTEM

FIELD OF THE DISCLOSURE

The present disclosure is generally related to methods and systems for adjusting search results.

BACKGROUND

Many search applications provide a search criteria page to allow users to adjust various search criteria before a search is run. Based on the search criteria, a search is performed to generate a set of search results. The search results may be displayed to the user in one or more subsequent pages. After viewing any of the subsequent pages, the user may wish to refine the search results. In this case, the user may back up to the search criteria page, make one or more adjustments, and run the search again. It may be difficult for some users to transition from a generic default search (e.g., searching from the Google homepage) to an advanced search page where multiple criteria may be adjusted.

DETAILED DESCRIPTION OF THE DRAWINGS

Disclosed herein are embodiments of a method, system and an interface in which a user manipulates an object in multi-dimensional space to simultaneously manipulate each of multiple search criteria. As the user manipulates the object, the user receives, in real-time, adjusted search results that are based on the modified search criteria. The interface provides an easy-to-understand, real-world, kinesthetic approach to tune search results in real-time after a search has been run.

Figure 1:
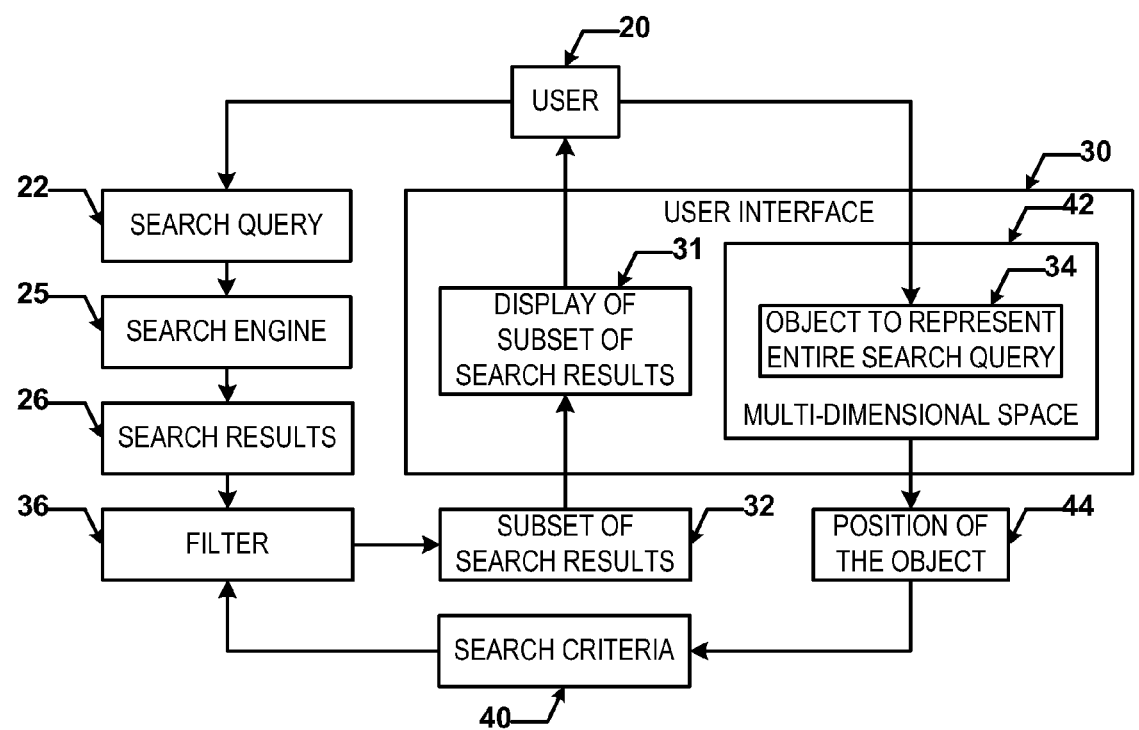
FIG. 1 is a block diagram of an embodiment of a system for adjusting which search results are presented to a user based on a search query entered by the user.

FIG. 1 is a block diagram of an embodiment of a system for adjusting which search results are presented to a user 20 based on a search query 22 entered by the user 20. The system comprises a search engine 25 which generates a plurality of search results 26 based on the search query 22. A user interface 30 provides a display 31 of at least a subset 32 of the search results 26 to the user 20.

The user interface 30 provides a user-manipulable object 34 that represents the entire search query 22, including all of its component parts entered by the user 20. If the search query 22 comprises a plurality of search words or phrases, the user-manipulable object 34 represents all of the search words or phrases. The user-manipulable object 34 may be either a physical object, or a virtual object displayed by a graphical user interface.

The user-manipulable object 34 controls a filter 36 that determines which of the search results 26 are to be included in the subset 32 displayed to the user 20. The filter 36 makes this determination based on a plurality of search criteria 40. Examples of the search criteria 40 include, but are not limited to, a degree of literal string matching, a degree of relevance to a history of prior searches, and a degree of relevance to a given topic.

The user-manipulable object 34 is located in a multi-dimensional space 42. The multi-dimensional space 42 may comprise a two-dimensional space, a three-dimensional space, or a space having more than three dimensions. The multi-dimensional space 42 has a plurality of axes, each of the axes representing a corresponding one of the search criteria 40. Values of the search criteria 40 are represented by positions in the multi-dimensional space 42. Thus, each point within the multi-dimensional space 42 represents a different blend of the search criteria 40.

Each axis may have a first endpoint that represents a most-broad value of its associated search criterion, and a second endpoint that represents a most-narrow value of its associated search criterion. For example, a degree of literal string matching may be indicated by a position along a first axis, wherein opposite directions along the first axis represent more literal/fuzzy searches, respectively. A degree of relevance to a history of prior searches may be indicated by a position along a second axis, wherein opposite directions along the second axis represent more/less relevance to the history, respectively.

The user-manipulable object 34 has a position 44 in the multi-dimensional space 42 at coordinates representing values of the search criteria 40. The user 20 can adjust all of the search criteria 40 at once by manipulating the position 44 of the user-manipulable object 34 in the multi-dimensional space 42. As the user 20 manipulates the position 44 of the object 34 in the multi-dimensional space 42, the following acts are performed in real-time: values of the search criteria 40 are modified or otherwise updated, the updated values of the search criteria 40 are provided to the filter 36, the filter 36 updates the subset 32 of the search results 26 to satisfy the new values of the search criteria 40, and the updated subset 32 is presented to the user 20 in the display 31. These acts enable the user 20 to refine the subset 32 of the search results 26 in real-time. In an embodiment, the filter 36 does not change the relative ordering of the search results 26 produced by the search engine 25.

The filter 36 may act to narrow the previous subset by removing one or more of search results therefrom, and/or broaden the previous subset by adding one or more of the search results 26 thereto. For example, if the user 20 has manipulated the object 34 such that all of its coordinates have more-narrow values, then the filter 36 narrows the search results 26 based each of the search criteria 40. As another example, if the user 20 has manipulated the object 34 such that all of its coordinates have more-broad values, then the filter 36 broadens the search results 26 based on each of the search criteria 40. As a further example, if the user 30 has manipulated the object 34 to have a first coordinate with a more-broad position, but a second coordinate with a more-narrow position, then the filter 36 may add some results but remove others from the subset 32.

Thus, each search criterion is either broadened, narrowed or shifted based on how the user has manipulated the object 34 along multiple axes at once in the multi-dimensional space 42. For example, the user 20 can manipulate the object 34 simultaneously along two axes to simultaneously adjust the search results 26 to be either more literal or more fuzzy, and be either more relevant or less relevant to a history of prior searches.

The user can manipulate the object 34 using either an electronic graphical user interface, a physical medium or a combination thereof to select points in the space 42. For example, the user 20 may use a two-dimensional input device, such as touchpad or a touchscreen, to select points in two-dimensional space. The user 20 may use a three-dimensional input device to sense a position of his/her hand in three-dimensional space. Examples of how the user can manipulate the object 34 in a graphical representation of the multi-dimensional space 42 include, but are not limited to: pointing-and-clicking at a particular point in the graphical representation of the multi-dimensional space 42, dragging the object 34 to a particular position in the graphical representation of the multi-dimensional space 42, and moving a tool tip or alternative pointer position within the graphical representation of the multi-dimensional space 42. Examples of how the user can manipulate the object 34 in physical space include, but are not limited to, raising, lowering, pushing, pulling, rotating or squeezing the object 34. In a physical space, the object 34 may have the form of a ball or a motion-enabled remote control (e.g. a motion-enabled television remote control for an interactive television platform or a motion-enabled cellular telephone).

In alternative embodiments, one or more one-dimensional controls can be used instead of a multi-dimensional space 42. An example of a one-dimensional control is a slider which allows user to adjust a single search criterion, for example to adjust search results to be more literal or fuzzy. Two one-dimensional controls can be used to adjust two search criteria. For example, a first slider may be positioned along a first axis to adjust the degree of literal string matching, and a second slider may be positioned along a second axis to adjust the degree of relevance to the history of prior searches. Similarly, three or more sliders can be used to provide a three-or-higher dimensional control. Any of the aforementioned sliders may be a graphical slider in a graphical user interface or a physical slider.

Figure 2:
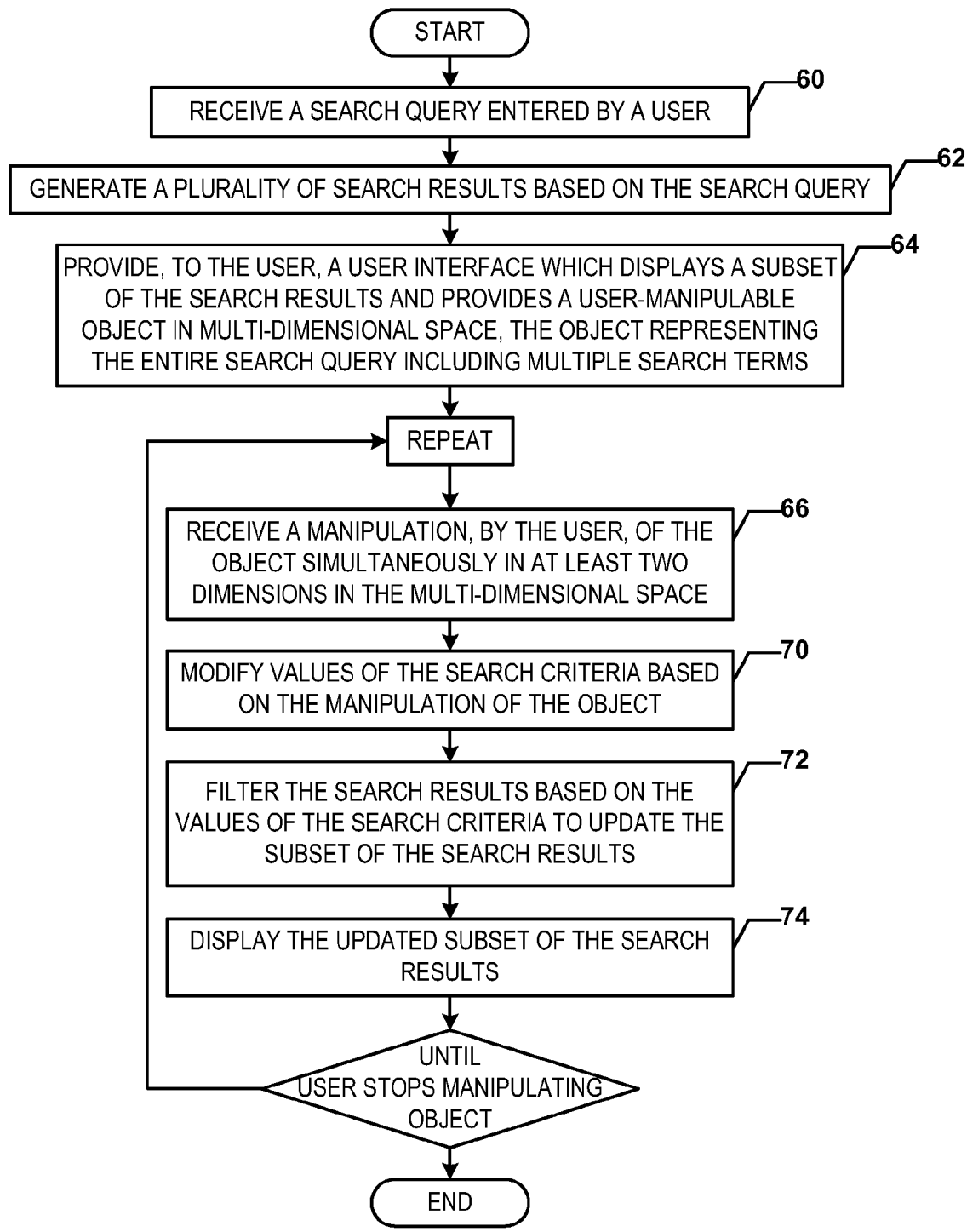
FIG. 2 is a flow chart of an embodiment of a search method.

FIG. 2 is a flow chart of an embodiment of a search method. The search method may use elements described with reference to FIG. 1.

As indicated by block 60, the method comprises receiving the search query 22 entered by the user 20. As indicated by block 62, the method comprises using the search engine 25 to generate the plurality of search results 26 based on the search query 22. As indicated by block 64, the method comprises providing the user interface 30 which displays the subset 32 of the search results 26 to the user 20, and provides the user-manipulable object 34 that represents the entire search query 22.

As indicated by block 66, the method comprises receiving a manipulation by the user 20 of the object 34 simultaneously in at least two dimensions in the multi-dimensional space 42. The at least two dimensions may comprise a first dimension associated with a degree of literal string matching and a second dimension associated with a degree of relevance to a topic, or a first dimension associated with a degree of literal string matching and a second dimension associated with a degree of relevance to a history of prior searches, or a first dimension associated with a degree of relevance to a history of prior searches and a second dimension associated with a degree of relevance to a topic, for example.

As indicated by block 70, the method comprises modifying values of at least two of the search criteria 40 corresponding to the at least two dimensions in which the object 34 is manipulated. As indicated by block 72, the method comprises filtering the search results 26 based on the modified values of the search criteria 40 to update the subset 32 of the search results 26. As indicated by block 74, the method comprises displaying the updated subset 32 of the search results 24 to the user 20, in real-time, as the user 20 is manipulating the object 34.

Flow of the method is directed back to block 66 to process subsequent manipulations of the object 34 until the user 20 has stopped manipulated the object 34.

Figure 3:
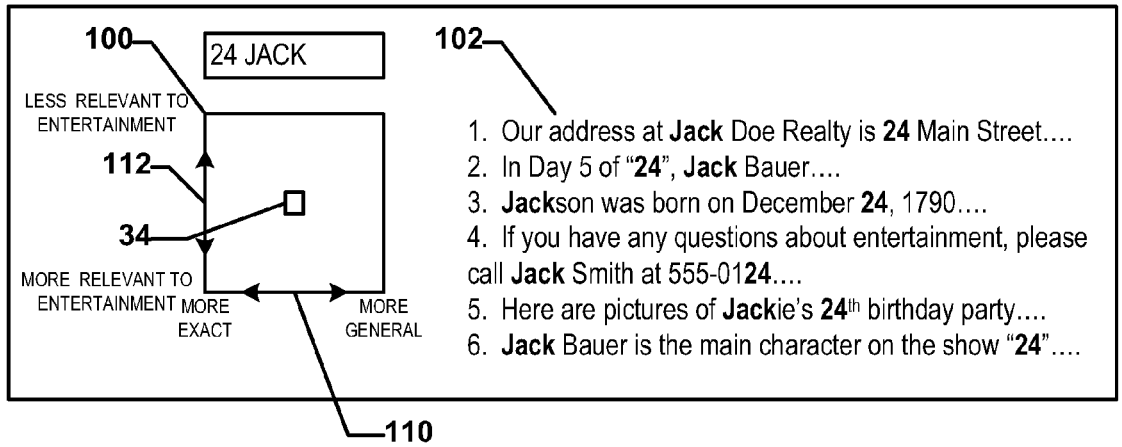
FIG. 3 shows an embodiment of a user interface for adjusting which search results are presented to the user.

FIG. 3 shows an embodiment of the user interface for adjusting which search results are presented to a user. The user interface comprises a portion 100 to provide a graphical representation of a two-dimensional space within which the object 34 can be manipulated by the user 20 to modify which search results are displayed in a portion 102.

In this example, the user 20 enters the search query 22 comprising broadly-used search terms "24" and "Jack". The user 20 is attempting to search for information about a character on a television show. The search engine 25 runs a generic search algorithm for the search query 22 comprising "24" and "Jack" to generate the search results 26. The search results 26 contain thousands of results.

The portion 102 displays an initial subset of the search results 26 to the user 20. Some of the results in the initial subset pertain to the "Jack" character on the "24" television show. Others of the results may pertain to actual people having "Jack" in at least part of their name, and who either have the digits "24" in their address, or have the digits "24" in their phone number, or were born on the $24^{th}$ of some month, or are 24 years old, or otherwise have the digits "24" on their Web page.

To filter out undesirable search results, the user 20 manipulates the object 34 which represents the entire search query 22 of "24" and "Jack". The multi-dimensional space 42 has a first dimension 110 which pertains to string matching and a second dimension 112 which pertains to relevance to a topic. Moving the object 34 in one direction in the first dimension 110 allows the user 20 to broaden the results from the exact terms of the search query 22. Moving the object 34 in an opposite direction in the first dimension 110 allows the user 20 to narrow the results toward the exact terms of the search query 22. The first dimension 110 may have endpoints labeled as "More Exact" and "More General", respectively. Moving the object 34 in the second dimension 112 allows the user 20 to change a degree of relevance to a topic of entertainment. The second dimension 112 may have endpoints labeled as "More Relevant to Entertainment" and "Less Relevant to Entertainment", respectively.

Consider the user 20 using either a touchpad, touchscreen, mouse or other pointing device to move the object 34 simultaneously toward "More Exact" and "More Relevant to Entertainment". As the object 34 is moved toward "More Exact" and "More Relevant to Entertainment", more of the search results that do not exactly match "24" (e.g. hypothetical search results 4 and 5) or "Jack" (e.g. hypothetical search results 3 and 5) and more of the search results that do not pertain to entertainment (e.g. hypothetical search results 1, 3 and 5) are dropped, in real-time, from the subset of results displayed to the user 20 in the portion 102. The user 20 continues to manipulate the object 34 toward "More Exact" and "More Relevant to Entertainment" until the updated subset of results displayed to the user 20 has a desirably-high proportion of results pertaining to the "Jack" character on the "24" television show.

Figure 4:
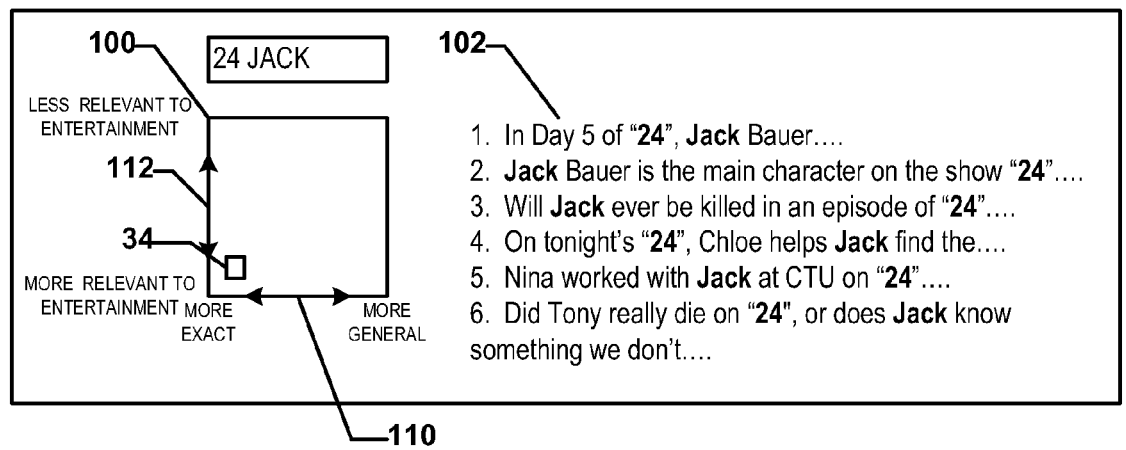
FIG. 4 shows an embodiment of the user interface after the user has completed manipulation of the object.

FIG. 4 shows an embodiment of the user interface after the user 20 has completed manipulation of the object 34. The final subset of results displayed to the user 20 in the portion 102 more literally matches the search query 22 and are more focused on entertainment topics in comparison to the initial subset.

Other examples are also contemplated. For example, consider a user looking for information on the movie "Sixteen Candles", but who cannot remember whether the actual movie title was "Sixteen" or "16". In this example, the user could search on the term "16 Candles" and then move the object 34 toward 'More General', resulting in more fuzzy logic (e.g., "Sixteen" along with "16") being applied to the search results displayed to him/her.

Figure 5:
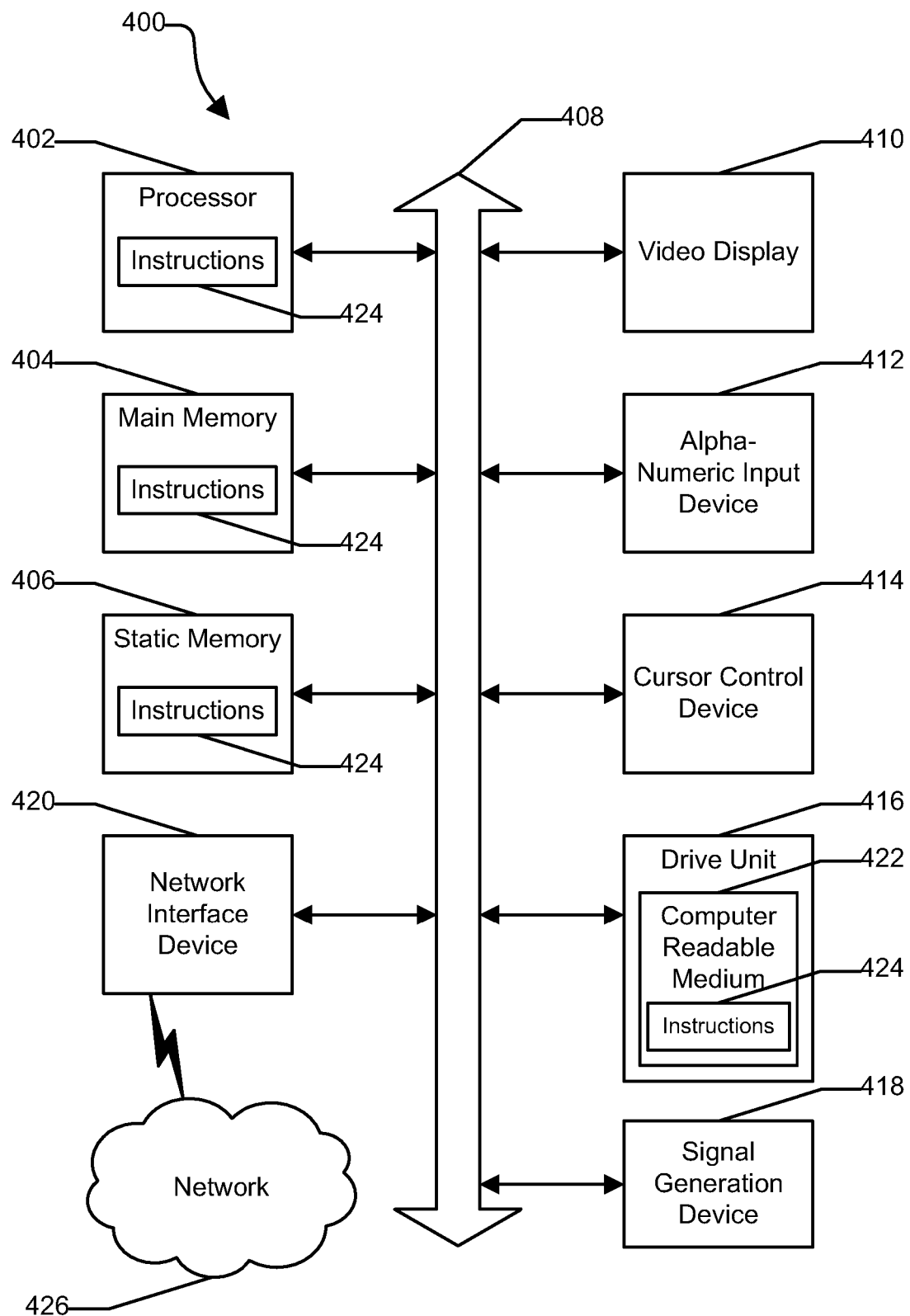
FIG. 5 is a block diagram of an illustrative embodiment of a general computer system.

Referring to FIG. 5, an illustrative embodiment of a general computer system is shown and is designated 400. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 5, the computer system 400 may include a processor 402, e.g., a central processing unit (CPU), a graphics processing unit (GPU), or both. Moreover, the computer system 400 can include a main memory 404 and a static memory 406, that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment, as depicted in FIG. 5, the disk drive unit 416 may include a computer-readable storage medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

While the computer-readable storage medium is shown to be a single medium, the term "computer-readable storage medium" includes a single medium or multiple media and/or associated caches and servers that store one or more sets of instructions. The term "computer-readable storage medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable storage medium can include a solid-state memory such as a memory card or other package that houses one or more non-volatile read-only memories. Further, the computer-readable storage medium can be a random access memory or other volatile re-writable memory. Additionally, the computer-readable storage medium can include a magneto-optical or optical medium, such as a disk or tapes or other storage device. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer implemented method comprising:
   entirely representing a search query comprising a plurality of search terms by an object in multi-dimensional space, the multi-dimensional space comprising a plurality of dimensions to represent a plurality of search criteria, respectively, the object having a position in the multi-dimensional space based on values of the search criteria, the search query used to generate a plurality of search results;
   modifying respective values of at least two of the search criteria based on a manipulation of the object simultaneously in at least two dimensions of the multi-dimensional space, wherein the at least two dimensions comprise a first dimension associated with a degree of literal string matching and a second dimension associated with a degree of relevance to a history of prior searches;
   filtering the search results based on the modified values of the search criteria to produce a subset of the search results; and
   displaying the subset.

2. The method of claim 1 wherein the object comprises a virtual object in a graphical user interface.

3. The method of claim 1 wherein the object comprises a physical object.

4. An apparatus comprising:
   a computer system programmed to:
   entirely represent a search query comprising a plurality of search terms by an object in multi-dimensional space, the multi-dimensional space comprising a plurality of dimensions to represent a plurality of search criteria, respectively, the object having a position in the multi-dimensional space based on values of the search criteria, the search query used to generate a plurality of search results;
   modify respective values of at least two of the search criteria based on a manipulation of the object simultaneously in at least two dimensions of the multi-dimensional space;
   filter the search results based on the modified values of the search criteria to produce a subset of the search results;
   display the subset; and
   wherein the at least two dimensions comprise a first dimension associated with a degree of relevance to a history of prior searches and a second dimension associated with a degree of relevance to a topic.

5. The apparatus of claim 4 wherein the object comprises a virtual object in a graphical user interface.

6. The apparatus of claim 4 wherein the object comprises a physical object.

7. A computer-readable storage medium encoded with a computer program, the computer program to cause a computer system to:
   entirely represent a search query comprising a plurality of search terms by an object in multi-dimensional space, the multi-dimensional space comprising a plurality of dimensions to represent a plurality of search criteria, respectively, the object having a position in the multi-dimensional space based on values of the search criteria, the search query used to generate a plurality of search results;
   modify respective values of at least two of the search criteria based on a manipulation of the object simultaneously in at least two dimensions of the multi-dimensional space;
   filter the search results based on the modified values of the search criteria to produce a subset of the search results; and
   display the subset, wherein the at least two dimensions comprise a first dimension associated with a degree of relevance to a history of prior searches and a second dimension associated with a degree of relevance to a topic.

8. The computer-readable storage medium of claim 7 wherein the object comprises a virtual object in a graphical user interface.

9. A method comprising:
   receiving a search query comprising a plurality of search terms;
   performing a search to generate a plurality of search results based on the search query;
   entirely representing the search query by a user-manipulable object in multi-dimensional space, the multi-dimensional space comprising a plurality of dimensions to represent a plurality of search criteria, respectively, the user-manipulable object having a position in the multi-dimensional space based on values of the search criteria;
   receiving a manipulation of the user-manipulable object simultaneously in at least two dimensions of the multi-dimensional space;
   modifying respective values of at least two of the search criteria based on the manipulation;

filtering the search results based on the modified values of the search criteria to produce a subset of the search results; and displaying the subset; wherein the at least two dimensions comprise a first dimension associated with a degree of relevance to a history of prior searches and a second dimension associated with a degree of relevance to a topic.

* * * * *